United States Patent
Parr

[11] Patent Number: 5,806,462
[45] Date of Patent: Sep. 15, 1998

[54] CLUMPING ANIMAL LITTER

[76] Inventor: Michael J. Parr, 4368 Hymount Dr., Sarasota, Fla. 34231

[21] Appl. No.: 661,321

[22] Filed: Jun. 13, 1996

[51] Int. Cl.$^6$ .................................................. A01K 29/00
[52] U.S. Cl. ........................................... 119/173; 119/171
[58] Field of Search .................................. 119/171, 172, 119/173

[56] References Cited

U.S. PATENT DOCUMENTS

| | | | |
|---|---|---|---|
| 4,258,660 | 3/1981 | Pris et al. | 119/171 |
| 4,657,881 | 4/1987 | Crammpton et al. | 119/173 X |
| 4,824,810 | 4/1989 | Lang et al. | 501/84 |
| 5,094,189 | 3/1992 | Aylen et al. | 119/173 |
| 5,329,880 | 7/1994 | Pattengill et al. | 119/171 |
| 5,339,769 | 8/1994 | Toth et al. | 119/173 |

*Primary Examiner*—Gene Mancene
*Assistant Examiner*—Yvonne R. Abbott
*Attorney, Agent, or Firm*—Bereskin & Parr

[57] ABSTRACT

An animal litter, particularly for cats, in which a gelatin solution is sprayed onto the granules and a dry adhesive is sprayed through the gelatin spray onto the granules. The gelatin solution provides enough dampening to adhere the adhesive particles to the clay particles, but because the gelatin sets quickly, it does not provide so much wetting as to activate the adhesive. Therefore the adhesive retains its adhesive properties and, together with the gelatin, causes the litter to clump when wetted by an animal.

13 Claims, 1 Drawing Sheet

CLUMPING ANIMAL LITTER

FIELD OF THE INVENTION

This invention relates to a litter material useful as a clumping animal litter. Commercially such materials are most commonly used as cat litters.

BACKGROUND OF THE INVENTION

Animals such as cats normally urinate in a litter box which contains a granular absorbent material sold as cat litter. The litter absorbs the urine and must be removed periodically. If the litter is of the type known as a non-clumping litter, then periodically the entire contents of the litter box must be removed and discarded. During the time when the contents of the litter box remain in the house, and as the contents day by day absorb continuing inputs of urine, odors can increase and the unpleasantness of keeping the used litter in the room rises.

For this reason clumping litters have been increasing in popularity, even though they are considerably more expensive than non-clumping litters. In clumping litters, the portion of the granular litter which has been wetted forms a relatively hard clump (at least hard enough to be picked up), usually within a short period of time. The clump can then be removed and discarded with a conventional sieve scoop, leaving the remainder of the litter in place for further uses. Litter can be added periodically as needed. Since clumping litters allow used portions of the litter to be discarded while keeping the rest, they are perceived as being more health friendly and in some ways as being more environment friendly than non-clumping litters, since commonly less litter must be discarded.

The cat litter market is dominated by clays, which constitute the bulk of the total tonnage of the market (up to 90% or more of the market). Cat litter clays can be divided into heavy weight clays and light weight clays. Heavy weight clays include fuller's earth, sodium bentonite, and calcium bentonite. Light weight clays include sepiolite, attapulgite (palygorskite), and moler.

The remainder of the market, typically less than 10%, is largely made up of a variety of non-clay substances, e.g. wood-based material such as sawdust and wood pellets, vegetable matter such as maize husks, and paper-based products such as waste paper and pulp residue. In addition some synthetic minerals such as gypsum-based and hydrated calcium silicates have been used.

So far as is known, the only naturally clumping litter is sodium bentonite, which is mined primarily from sources in Wyoming, U.S.A. Because of the limited sources of sodium bentonite, and because of the cost of shipping a heavy clay product, clumping litters made from this material tend to be much more expensive than non-clumping clay litters which can be produced from local sources. The consumer price of a clumping litter made from sodium bentonite clay may therefore typically be double or more that of non-clumping clay litters.

For this reason, many attempts have been made to produce clumping litters using base materials other than sodium bentonite, or with reduced amounts of sodium bentonite.

One of the first patents disclosing the use of sodium bentonite clay as a clumping litter is U.S. Pat. No. 5,000,115 issued Mar. 19, 1991 to Hughes. As mentioned, a problem with sodium bentonite is its limited availability and high cost. In addition, because it forms relatively hard clumps in the presence of water, it is not readily flushable since it tends to clog toilets.

U.S. Pat. No. 5,458,091 issued Oct. 17, 1995 to Pattengill et al discloses a clumpable animal litter having between 5 and 50 percent by weight bentonite with clumping materials which gum, added to help the litter clump. This has not so far as is known produced a clumping litter which clumps as well as sodium bentonite.

U.S. Pat. No. 5,452,684 issued Sep. 26, 1995 to Elazier-Davis et al discloses another method of using a smectite clay which forms stronger clumps, using a particular extrusion process. The examples described in this patent again use sodium bentonite clay which is costly and of limited availability.

U.S. Pat. No. 5,469,809 issued Nov. 28, 1995 to Coleman discloses the use of a mixture of sodium bentonite and opal clays, with calcium lignosulfonate as a hardener. This patent requires 10 to 50 percent sodium bentonite, which is again costly.

U.S. Pat. No. 5,193,489 issued Mar. 16, 1993 to Hardin discloses improving the clumping ability of a poorly clumping earth or clay by mixing it with a gum such as guar gum. The gum is mixed in dry powder form with the clay (since wetting the gum would destroy its adhesive properties). A problem with this type of litter is that it is found that the gum granules separate from the clay granules in the litter bag or in the litter box in use, thereby reducing the likelihood that the resultant litter material will clump when wetted by an animal.

U.S. Pat. No. 5,101,771 is an example of an animal litter formed by non-clumping clay combined with a clumping agent which is adhered to the clay by a material such as mineral oil. A problem with this arrangement is that so much mineral oil and clumping agent are required that the cost of the product approaches that of a clay made with sodium bentonite.

The disclosures of the above identified patents are hereby incorporated by reference into this description.

It is therefore an object of the present invention to provide an animal litter which has improved clumping qualities achievable at relatively low cost, and using either no sodium bentonite clay or a very small proportion of sodium bentonite clay.

In one of its aspects the invention provides an animal litter comprising: a particulate earth substrate having a poor clumping ability mixed with a water activateable adhesive present in an amount sufficient to increase the clumping ability of the earth substrate, said adhesive material being present in particulate form and being adhered to said earth substrate by a gelatin.

In another aspect the invention provides a method of producing an animal litter comprising: mixing a particular earth substrate having poor clumping ability with a water activateable dry adhesive in an amount sufficient to increase the clumping ability of the earth substrate, and adhering said adhesive to said particulate substrate by a gelatin.

Further objects and advantages of the invention will appear from the following description, taken together with the accompanying drawings.

DETAILED DESCRIPTION OF PREFERRED EMBODIMENT

Figure 1:
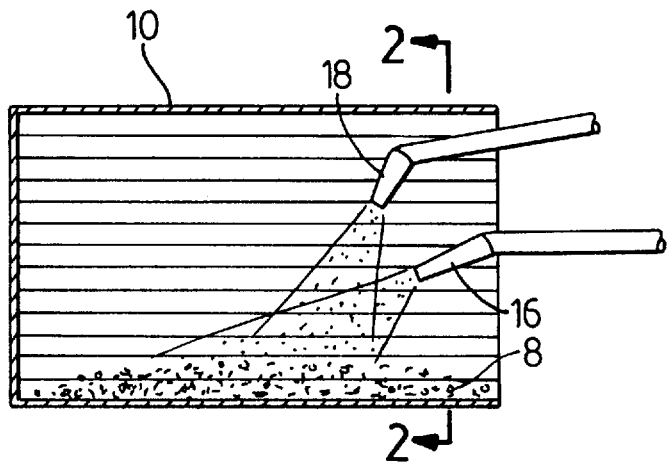
FIG. 1 is a side sectional view of a barrel mixer showing adhesive and gelatin materials being sprayed onto granules in the mixer.

The invention in its preferred form uses as its major component an earth like material, e.g. a clay such as fuller's earth, calcium bentonite, palygorskite, sepiolite, attapulgite, diatomaceous earth, or the like. If desired a small quantity (e.g. 5 to 10 percent by weight) of sodium bentonite can be added, but this is not essential. Such a mixture would normally be non-clumping or (if it contains a small quantity of sodium bentonite) would be very poorly clumping if at all. To the mixture is added a granular adhesive, which can be a gum selected from the galactomannan gums, such a guar gum or a derivative thereof (as disclosed in Hardin U.S. Pat. No. 5,193,489), or can be another suitable adhesive, such as a starch (e.g. corn starch), or can be another vegetable gum such as acacia gum, e.g. gum arabic or tragacanth.

A property of the gums and starches of the kind mentioned is that once they are thoroughly wetted, e.g. by cat urine, they are activated and will, if well mixed with the clay particles of the litter, cause the litter to clump. However once they have been wetted and thereby activated, at least most of them are in effect "spent", i.e. they will not if dried be reactivatable by further wetting. In other words, once fully wetted and then dried, they loose their adhesive properties. For this reason the guar gum disclosed in the Hardin U.S. Pat. No. 5,193,489 is disclosed as being dry mixed, and it is further disclosed that the particles of guar gum and the clay particles should be of approximately equal size, the reason for this being that the guar gum and clay particles are then less likely to separate in transportation and use. However it is impractical to ensure that the gum particles and clay particles will always be of approximately the same size, and it is found that the respective particles will in any event separate during transportation and use. In addition there is a considerable dusting problem from the mixture of dry particles.

Therefore, according to a preferred aspect of the invention, either the earth particles, or the adhesive particles, or both, are wetted in a special manner either before or during being brought together. The wetting is by a gelatin solution. The gelatin solution provides enough dampening in effect to stick the adhesive particles to the earth particles, but because the gelatin sets or gels quickly, it does not provide so much wetting as to activate the adhesive (which would destroy its adhesive properties).

Gelatin is a very well known and long used product, and is obtained by the partial hydrolysis of collagen derived from the skin, white connective tissue, and bones of animals. The most common sources of commercial gelatin are the bones and hides of animals, typically cattle hides and pork skin. Gelatin production, and various properties of gelatin, are well described in "*Gelatine*" published by The Gelatine Manufacturers Institute of America Inc., 1993, which disclosure is hereby incorporated by reference into this description. The particular type of gelatin used with this invention is not critical, so long as it will set or gel reasonably quickly at an appropriate temperature used in the process, and so long as it remains in gel or hardened form at room temperature.

According to a preferred embodiment of the invention, and as shown in the drawings, suitable granules 8 e.g. of calcium bentonite or other earth materials, e.g. diatomaceous earth, are introduced into a rotating barrel 10 which rotates in the direction of arrow 12. The granules 8 may be introduced simply by shovelling them or otherwise conveying them into the barrel 10. Ridges 14 in the side of the barrel 10 carry the granules 8 about half way up the side before they fall back to the bottom of the barrel under the influence of gravity.

An aqueous gelatin solution is sprayed onto the granules through nozzle 16, which is directed in a slightly downward direction toward the granules 8 rising on the upwardly moving side of the barrel 10. A dry adhesive powder is sprayed through nozzle 18 through the gelatin solution spray and onto the granules in the barrel. Because the powdered adhesive is sprayed through the gelatin spray, the gelatin spray wets both the adhesive particles and the granules, helping to ensure that the adhesive particles and the granules of earth will stick together.

The gelatin is preferably sprayed at a relatively low temperature (e.g. 85 to 90 degrees F.), at which it is relatively viscous and less likely to be absorbed by the absorbent earth granules. In addition, provided that the gelatin gels relatively quickly, it will not saturate and activate the adhesive, so that the adhesive can retain its adhesive properties when it is wetted by an animal. Different types of gelatin are commercially available which gel at different temperatures, or different concentrations of gelatin in water can be used for this purpose (a higher concentration gels at a higher temperature).

As mentioned, various adhesives can be adhered to the absorbent earth granules 8 in the above manner. In all cases the adhesives will be in dry powder form. Adhesives which may be used are animal glues, vegetable adhesives such as starches, dextrins (derived from corn, wheat, potatoes or rices), gums such as gum arabic, agar, algin, tragacanth and guar, cellulose adhesives, resins such as tree pitches and mastics, mineral adhesives such as cements, Portland cement, plaster of paris, and synthetic adhesives. However the adhesive which is used should be selected bearing in mind the need to utilize a cost effective amount of adhesive, and not to use so much that the cost of the litter would approach that of a litter using sodium bentonite.

In all cases, the particles of adhesive to be adhered to the earth granules are trapped within or on the surface of the gelatin, which should therefore cool and gel quickly so as not to activate the adhesive prematurely.

EXAMPLE 1

A gelatin formulation was prepared by adding 27.8 grams of 275 Bloom DynaGel brand gelatin to 210 ml of water, while stirring the water to assure uniform distribution and mixing of the gelatin. The mixture was then heated to 95 degrees F., while mixing, to fully dissolve the gelatin. The gelatin was then sprayed using a "sure shot atomizer" obtained from Milwaukee Sprayer Mfg. Co. A spray nozzle was used which produced a fine to medium mist with a 45 to 60 degree angle cone.

Figure 2:
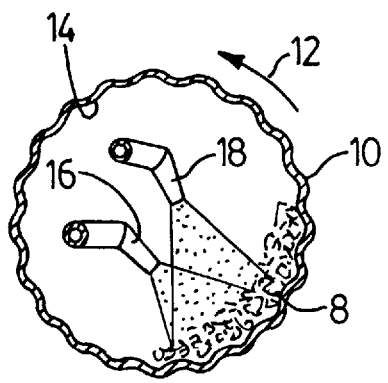
FIG. 2 is a sectional view along lines 2—2 of FIG. 1.

Three lbs. of "Kitty White" brand cat litter (a non-clumping clay base product) of approximately 4 to 20 mesh in size, manufactured by Mid Florida Mining Company, were then placed in the barrel described in FIG. 1 and 2. The barrel was of dimensions 19 inches long and 15 inches in diameter and was rotating at 15 to 20 RPM. The ambient air temperature was 85 degrees while the clay granules were 83 degrees. The gelatin solution referred to above was tested to gel below 85 degrees F.

63 ml of the gelatin solution held at 95 degrees were placed in the sprayer and sprayed onto the clay as the clay granules rotated in the drum. A fine powder consisting of a total of 21 grams of guar gum was dry sprayed onto the granules through the gelatin spray, as indicated in the drawings, to ensure coating of both the guar gum particles and the clay granules by the gelatin.

After all of the materials were introduced in this manner, rotation of the drum was terminated and the contents were placed in a 45 mesh sieve to eliminate particulates which may not have adhered to the clay granules.

The product produced was free-flowing and was tested for clumpability. Very good clumps were produced when contacted by water. Clumps which could be removed by grasping them between thumb and forefinger were obtained in as little as one minute after the addition of water. This was a more severe test than simply using a standard cat litter scoop (because of the higher pressures applied using fingers). Clumps which could be picked up in this manner could easily be picked up by a standard cat litter scoop. While the clumps held their form well, they could readily be flushed down a toilet because the clay used in the cat litter was a non-swelling clay (it appeared to be calcium bentonite), and because the gelatin rehydrates, releasing the granules.

EXAMPLE 2

One lb. of "Kitty White" brand clay based cat litter (commercially available from Mid Florida Mining of Florida, U.S.A.) was placed in a food processor in which the blades had been wrapped in duct tape to provide a blunt edge in contact with the litter. The food processor caused the clay granules to rotate and mix at a relatively high speed. As this occurred, 21 ml of the gelatin solution described above, held at 87 degrees F, were poured on top of the granules together with 7 grams of dry powder guar gum. The guar gum and gelatin granules were each poured in separate streams but concurrently. The granules were allowed to mix for 2 seconds after the guar gum and gelatin had been added, after which the mixture was immediately poured into a 45 mesh sieve to eliminate guar which may not have adhered to the granules.

Water was then added and a satisfactory clump for removal between thumb and forefinger was obtained within one minute after addition of the water.

EXAMPLE 3

Three lbs. of diatomaceous earth obtained from a commercial cat litter source, namely "Tidy Cat" manufactured by Ralston Purina, were placed in the barrel described above and under the same conditions outlined in Example 1. 63 ml of the gelatin solution prepared in Example 1 were sprayed while a total of 27 grams of dry powder guar gum was sprayed on concurrently as described. Immediately after the gelatin and guar gum were applied, the contents were placed in a 45 mesh sieve to remove any guar particles which may not have adhered to the granules, as well as to remove small clay particles and dust.

Water was then added and clumps suitable for removal with thumb and forefinger formed within two minutes.

EXAMPLE 4

The same conditions were used as in Example 1, except that acacia powder was used in place of guar. 15 grams of acacia powder were sprayed. After application, the litter was sieved in a 45 mesh sieve and tested for clumpability. Water was added and clumps suitable for removal by thumb and forefinger formed within one minute.

EXAMPLE 5

The experiment was set up exactly as in Example 1, except that a starch was used in place of guar gum. The starch used was Polar Gel (a powder), obtained from American Maize Corporation. This is a corn starch in which the starch molecules have been linked together through chemical bonds (e.g. with such cross linking agents as phosphorus oxychloride or adipic anhydride). 15 grams of this modified starch were sprayed on the clay granules. After sieving, the litter was tested for clumpability. Clumps suitable for removal with thumb and forefinger were formed within one minute.

EXAMPLE 6

The experiment was set up exactly as in Example 1, except that ordinary corn starch was used as an adhesive. In addition the ambient air temperature on the day in question was 89 degrees F. The gelatin solution was heated and kept at 98 degrees F. 15 grams of instant corn starch from American Maize Corporation were sprayed on the clay. After sieving, the clay was tested for clumpability. Clumps suitable for removal with thumb and forefinger were formed within one minute.

EXAMPLE 7

This experiment was set up as in Example 6, but fuller's earth was used instead of clay. The same corn starch was used as in Example 6. After sieving, the product was tested for clumpability. Clumps suitable for removal with thumb and forefinger formed within two minutes.

EXAMPLE 8

This experiment was set up as in Example 6, but instead of corn starch, dextrin from American Maize Corporation was used. The gelatin solution was as before heated and kept at 98 degrees F. 15 grams of dextrin were sprayed on the clay granules. After sieving, the product was tested for clumpability. Clumps suitable for removal with thumb and forefinger formed within one minute.

EXAMPLE 9

This experiment was set up as in Example 8, except that fuller's earth was used instead of clay. Again 15 grams of dextrin were sprayed together with the gelatin. After sieving, the product was tested for clumpability. Clumps suitable for removal with thumb and forefinger formed within two minutes.

EXAMPLE 10

This experiment was performed using only clay and gelatin, to demonstrate that a liquid spray of gelatin, sprayed onto clay, can be used without additional adhesive under certain circumstances to bind the clay granules together into a scoopable clump when wetted.

For this experiment, a gelatin solution was prepared utilizing 16.5 grams of gelatin in 63 ml of water. This solution was heated to 125 degrees F. to keep the viscosity low enough so that it could be sprayed using the sure shot atomizer described previously. The entire solution was then applied to clay granules ("Kitty White", a non-clumping litter obtained from Mid Florida Mining in the rotating barrel. After application, the granules were observed to have a relatively uniform coating of gelatin. (A partial coating of gelatin on each granule is also sufficient to hold them together.) The product was then sieved to eliminate particles smaller than 45 mesh, and the resulting mixture was tested for clumpability. After application of water, clumps which could be removed by thumb and forefinger were observed to form within 1.5 minutes.

While the gelatin alone worked well, it is noted that the amount of gelatin used (and consequently its cost) was approximately double that used in the experiments which also used a separate adhesive adhered to the litter granules by the gelatin. Since gelatin is more costly than most of the adhesives, the use of gelatin alone is less cost effective than use of gelatin with a separate adhesive, and in addition it required more heating. The least costly adhesives were the corn starches and guar gums, which are relatively inexpensive.

It is found that in each of the cases described above, if a small amount of sodium bentonite is added, e.g. 5 to 10 percent by weight, and preferably 5 percent, then the litter will clump somewhat more quickly and the clumps will have increased durability. However use of sodium bentonite is not necessary, and in fact its use may in some cases tend to cause clogging if the clump litter is flushed down a toilet since in that case it is preferred that the clumps not be of undue durability or swelling ability and that they flush away easily.

EXAMPLE 11

Some manufacturers may prefer to use some sodium bentonite as a clumping agent, since they are accustomed to working with it and have experience with its particular properties. An experiment was therefore performed using one lb. of "Kitty White" brand cat litter (calcium bentonite). This product was spread on a flat surface in a layer about one quarter inch thick, after which 45 grams of sodium bentonite were sprinkled onto the surface of the calcium bentonite, using a sieve (as if salt were being sprinkled onto the calcium bentonite). The sodium bentonite used was from a commercial cat litter, namely "Fresh Step Scoop" produced by the Chlorox Company (which was pure sodium bentonite).

Next, a heated gelatin solution was made up, consisting of 3 grams of gelatin in 22 ml water. Half the gelatin solution was sprayed onto the mixture of calcium and sodium bentonite. The mixture was then mixed by hand and then replaced on the flat surface. Another 45 grams of sodium bentonite was sprinkled on top (for a total of about 17% by total weight) and then sprayed with the remainder of the gelatin/water solution. The resultant product was placed in a rotating barrel to break apart any clumps of clay that may have adhered to one another. The mixture was then sieved to eliminate particles smaller than about 1 mm long which would also have eliminated particles of the sodium bentonite that may not have adhered to the calcium bentonite.

The mixture was then water tested for clumpability. After 3 minutes, clumps formed which could be picked up by grasping between thumb and forefinger.

Had the calcium and sodium bentonite been mixed together without gelatin, poor if any clumping would have resulted. Because sodium bentonite used in cat litter is normally smaller in particle size than calcium bentonite used in cat litters, a severe settling problem occurs. The gelatin solves the settling problem by adhering the sodium bentonite to the calcium bentonite, so that clumping can then occur.

The foregoing discussion and examples are presented as illustrative and should not be taken as limiting. Other variations within the spirit and scope of this invention are possible and will present themselves to those skilled in the art.

I claim:

1. An animal litter comprising: a particulate earth substrate having a poor clumping ability, the particulates of said earth substrate being coated with a gelatin and with a water activateable adhesive for increasing the clumping ability of said earth substrate, said water activateable adhesive being in particulate form and the particulates of said water activateable adhesive being adhered to the particulates of said earth substrate solely by said gelatin and being unactivated.

2. An animal litter as claimed in claim 1 wherein a major component of said earth substrate is selected from the group consisting of fuller's earth, calcium bentonite, diatomaceous earth, attapulgite, polygorskite, and sepiolite.

3. An animal litter according to claim 2 wherein said major component is calcium bentonite.

4. An animal litter according to claim 2 wherein said adhesive is a plant gum.

5. An animal litter according to claim 4 wherein said adhesive is a guar gum.

6. An animal litter according to claim 2 wherein said adhesive is a starch.

7. An animal litter according to claim 6 wherein said adhesive is a corn starch.

8. An animal litter according to claim 1 and including up to 10 percent by weight sodium bentonite particulate earth substrate.

9. An animal litter according to claim 1 and including up to 5 percent by weight sodium bentonite particulate earth substrate.

10. A method of producing an animal litter comprising:

selecting a particulate earth substrate having poor clumping ability, and spraying simultaneously on said substrate a first stream of water activateable dry adhesive in particulate form for increasing the clumping ability of the earth substrate, and a second stream of gelatin, said gelatin adhering the particulates of said adhesive to the particulates of said earth substrate while not activating said adhesive.

11. A method according to claim 10 wherein said gelatin is sprayed onto said particulate earth substrate in a selected spray pattern, and said dry adhesive is sprayed through said spray pattern of said gelatin.

12. An animal litter produced according to the method of claim 10.

13. A method of producing an animal litter comprising:

providing a particulate earth substrate comprising granules having a poor clumping ability and further including up to ten percent by weight of sodium bentonite particulate earth substrate, mixing said particulate earth substrate and said sodium bentonite to form a mixture thereof, and spraying a heated gelatin solution on said mixture, and then cooling the resultant product to form a plurality of granules of said substrate with the particles of sodium bentonite adhered thereto by said gelatin and without causing swelling of said particles of said sodium bentonite.

* * * * *